United States Patent
Narayanan et al.

(10) Patent No.: US 8,862,606 B1
(45) Date of Patent: Oct. 14, 2014

(54) EXECUTING CORRELATED AND MULTI-ROW SUBQUERIES IN A MPP DATABASE

(75) Inventors: Sivaramakrishnan Narayanan, Sunnyvale, CA (US); Florian Michael Waas, San Francisco, CA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/240,923

(22) Filed: Sep. 22, 2011

(51) Int. Cl.
  *G06F 17/30* (2006.01)

(52) U.S. Cl.
  USPC .................................................. 707/765

(58) Field of Classification Search
  USPC .................................................. 707/765
  See application file for complete search history.

(56) References Cited

U.S. PATENT DOCUMENTS

| | | | |
|---|---|---|---|
| 5,590,319 A * | 12/1996 | Cohen et al. | 1/1 |
| 5,761,657 A * | 6/1998 | Hoang | 1/1 |
| RE37,965 E * | 1/2003 | Jhingran et al. | 1/1 |
| 2002/0065956 A1* | 5/2002 | Yagawa et al. | 709/330 |
| 2005/0187977 A1* | 8/2005 | Frost | 707/104.1 |
| 2006/0074934 A1* | 4/2006 | Dettinger et al. | 707/100 |
| 2010/0094851 A1* | 4/2010 | Bent et al. | 707/706 |

OTHER PUBLICATIONS

Lu et al., "On Global Multidatabase Query Optimization", Dec. 4, 1992, Sigmod Record, vol. 21, No. 4, pp. 6-11.*
Epstein et al., "Distributed Query Processing in a Relational Data Base System", 1995, pp. 169-180.*
Taniar et al., "A High Performance Object-Oriented Distributed Parallel Database Architecture", 1995, pp. 498-507.*

* cited by examiner

*Primary Examiner* — Etienne Leroux
*Assistant Examiner* — Jared Bibbee
(74) *Attorney, Agent, or Firm* — Barry N. Young

(57) ABSTRACT

The invention enables a correlated or multi-row subquery (CSQ) to be performed on distributed MPP and shared-nothing databases by broadcasting intermediate results, prior to a correlation operation, from subquery execution on one segment to all other segments in the distributed database so that the respective CSQs of each segment will have access to the necessary results to permit correct execution of the CSQ. Additionally, the intermediate results are saved to disk to avoid the necessity of replicating the same intermediate results multiple times during execution of a subquery plan.

14 Claims, 5 Drawing Sheets

EXECUTING CORRELATED AND MULTI-ROW SUBQUERIES IN A MPP DATABASE

BACKGROUND

This invention relates generally database queries, and more particularly to correlated and multi-row subqueries in parallel databases.

A correlated subquery (CSQ) is a query that is nested within an outer query and references a value from the outer query. If the CSQ is executed on a single database, all of the data needed for the CSQ resides on the single database and is available to the CSQ. Thus, the execution is straightforward. However, in a distributed database, for example, a database having a massively parallel processing (MPP) or a shared-nothing architecture, the data is distributed across multiple different segments; and each segment has different data. A similar situation exists with multi-row subqueries where the subquery needs to combine the results from multiple rows of one or more tables that may be distributed across different segments. Thus, while in a conventional distributed database each segment may execute the same query plan, correlated and multi-row subqueries (together referred to herein as correlated subqueries or CSQ's) generally cannot be used with distributed databases because the different segments usually do not have either the necessary data to execute the CSQ, or a mechanism to conveniently locate the missing data that might be randomly distributed across multiple different segments. This has made certain CSQ subqueries on parallel distributed databases problematic and at times unworkable. This is particularly so with respect to MPP and shared nothing databases.

It is desirable to address the foregoing and other problems by providing distributed parallel databases with the ability to use correlated and multi-row subqueries in a similar manner to the way in which such CSOs can be used on a single database system. It is to these ends that the present invention is directed.

DESCRIPTION OF PREFERRED EMBODIMENTS

The invention is particularly adapted to use with massively parallel processing (MPP) distributed databases and will be described in that context. It will be appreciated, however, from the description which follows that this is illustrative of only one utility of the invention, and that the invention may be used with other databases.

Figure 1:
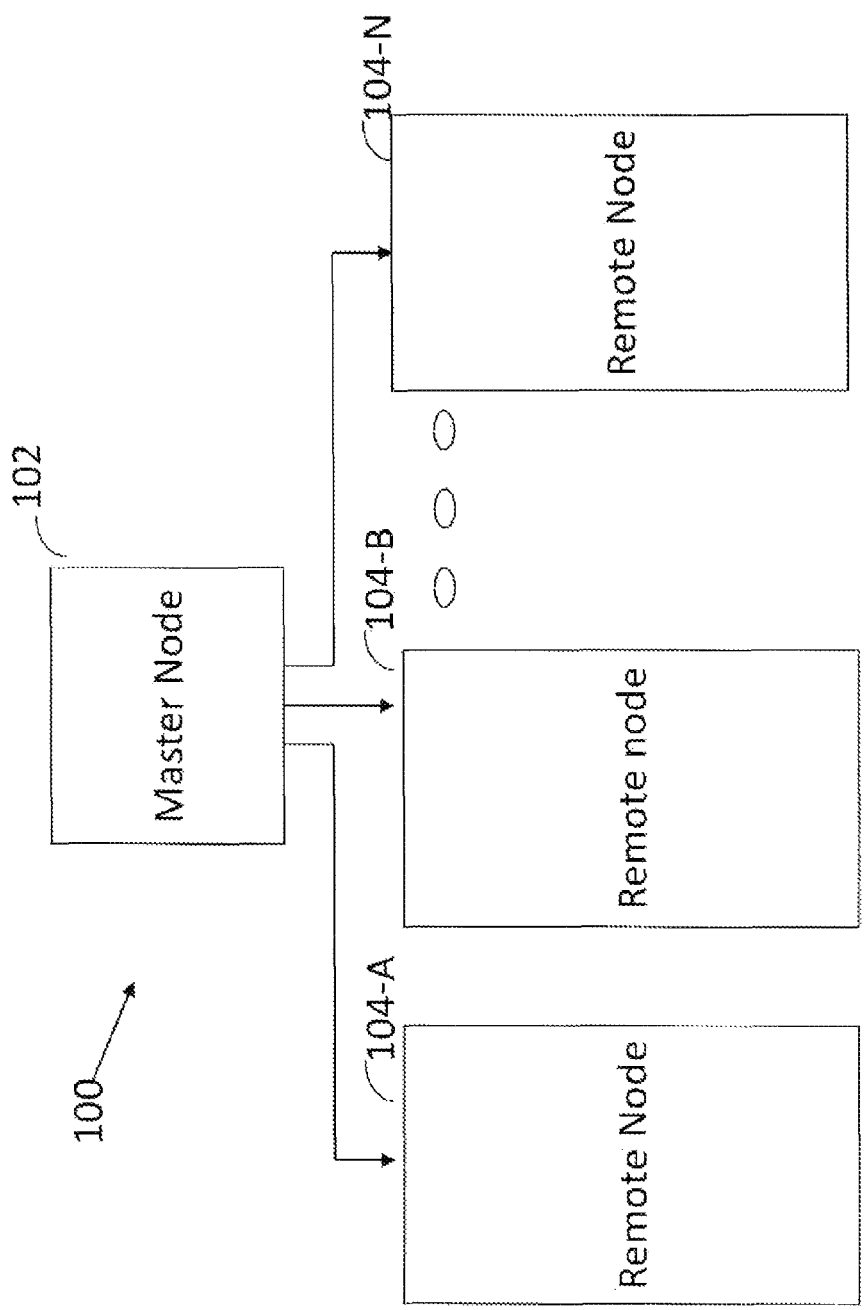
FIG. 1 is a block diagram of a distributed database architecture of the type with which the invention may be used.

FIG. 1 illustrates the architecture of a known type of distributed database system 100, such as an MPP database system having a shared-nothing architecture, for example, with which the invention may be employed. The database system may include a master node 102 and a plurality of distributed remote nodes 104-A through 104-N connected together by a network. The nodes of the system may be independent of one another and may perform a plurality of database operations in parallel. Each node may be associated with one or more database instances, for instance. The master node 102 may coordinate the database operations of the remote nodes 104.

Figure 2:
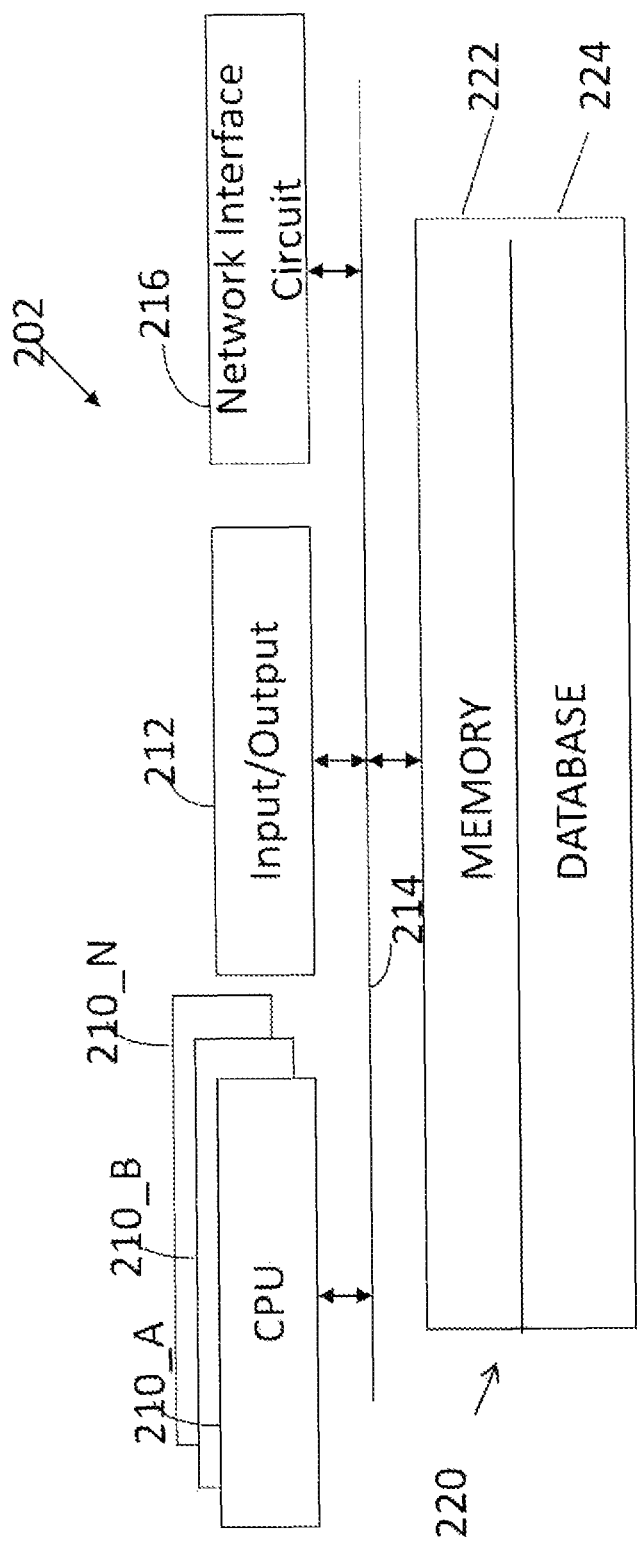
FIG. 2 is a block diagram of a node of the database of FIG. 1.

FIG. 2 illustrates a node 202 configured to implement operations in accordance with the invention. The node 202 may be a remote node 104 of FIG. 1; the master node 102 may have substantially the same architecture. Node 222 may includes standard components, such as one or more CPUs 210_A through 210_N. The CPUs are attached to input/output devices 212 via a bus 214. The input/output devices 212 may include standard components, such as a keyboard, mouse, display, printer and the like. A network interface circuit 216 may also be connected to the bus 214, allowing the node 202 to operate in a networked environment.

A memory 220 is also connected to the bus 214. The memory 220 may comprise a conventional storage medium 222 for storing computer readable executable instructions to control the operation of one or more of the CPUs to implement embodiments of the invention, and may include one or more database segments 224 for storing data. If node 202 is the master node, the memory 222 may also include a query planner that develops a query plan to execute a query, and dispatches the query plan to the distributed nodes 104 for execution. A query plan specifies a set of steps that are used to access or modify the data associated with the query that is stored in one or more of the distributed databases 224.

To better understand the invention, the operation of a CSQ on a single-node database will first be described, and then the CSQ in accordance with the invention will be illustrated for distributed databases.

Consider the following CSQ on catalog tables "pg_attribute" and "pg_class":
  explain select * from pg_attribute where attrelid=(select
    min(oid) from pg_class where oid=attrelid);
and the associated query plan:
  Seq Scan on pg_attribute
    Filter: attrelid=((subplan))
    SubPlan 1
      ->Aggregate
        ->Seq Scan on pg_class
          Filter: oid=$0
  (6 rows)

Figure 3:
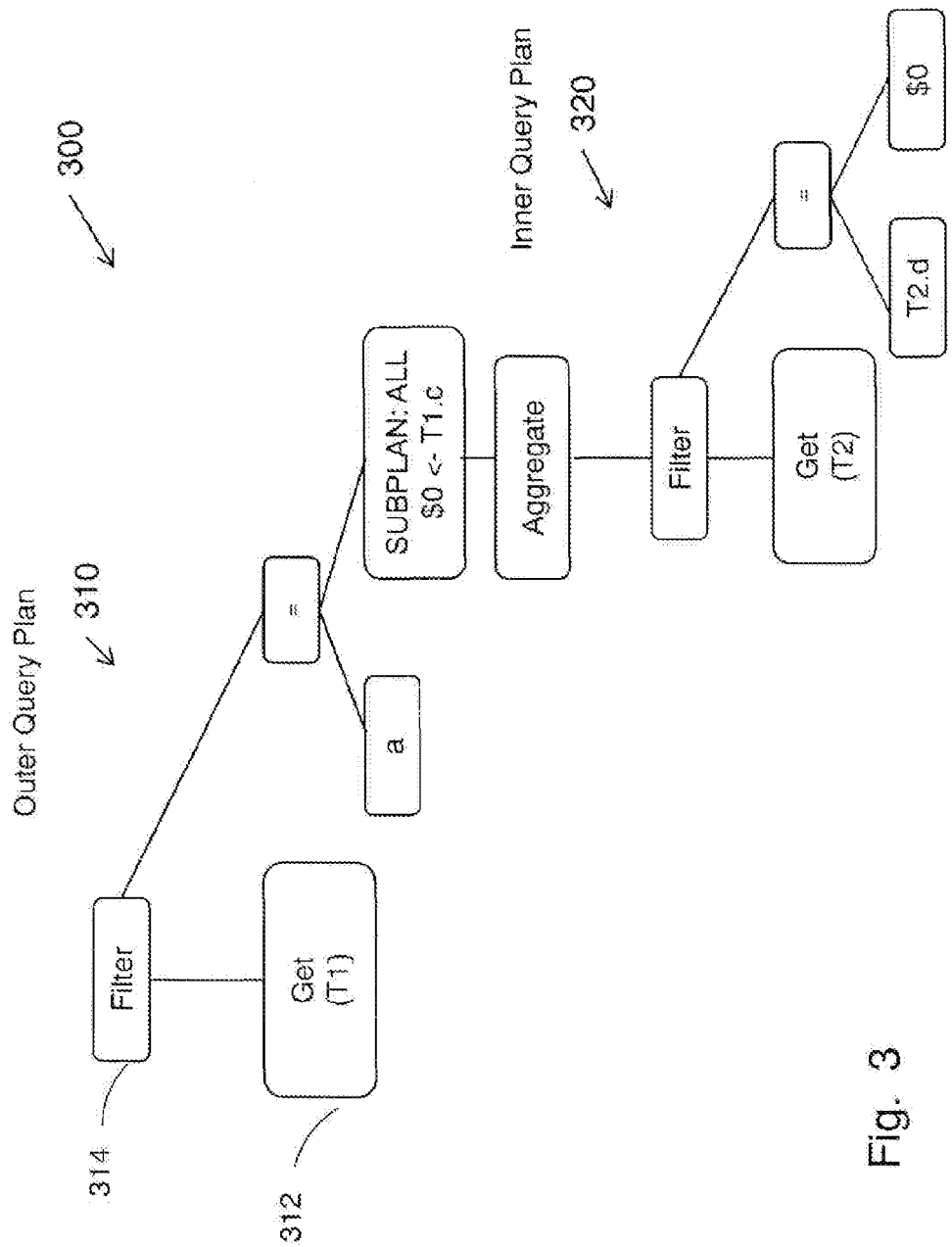
FIG. 3 is a diagrammatic representation of an execution plan for a correlated subquery (CSQ) on a single-node, non-distributed database.

An execution plan 300 for this CSQ is illustrated in FIG. 3. It comprises an outer query plan 310 and an inner query plan (SubPlan) 320. The plan 300 involves the following steps. The sequential scan operator [Get (T1)]312 of the outer query plan 310 gets an attribute value (attrelid) "a" of a next row of table T1 (pg_attribute). It sets parameter $0 to the value of "a" from this row. It evaluates the filter 314 which involves running the inner query plan (SubPlan) 320. The inner query plan is evaluated as a regular query with a fixed parameter value for each row of table T2, and it returns a single scalar value, i.e., min(oid) from table T2 (pg_class). The top level filter 314 checks whether a=the scalar value returned from the SubPlan 320. If this condition is satisfied, the Get (T1) operator returns the value of the row of T1 (pg_attribute) being evaluated as a partial answer to the query, otherwise it skips the row. The foregoing steps are then repeated for all rows.

This query is a CSQ because the inner subquery 320 on table T2 depends on the value returned by the outer main query 310 on table T1. As long as the two tables are in the same database segment, the evaluation of this CSQ is straightforward because all the data is available in a single location. However, in a distributed database, the data is distributed across multiple different segments, and each segment generally has different data. Because the different segments usually do not have either the necessary data to execute the CSQ, or a mechanism to conveniently locate the missing data that might be randomly distributed across multiple different segments, the above CSQ plan could not be evaluated on a distributed database.

Figure 4:
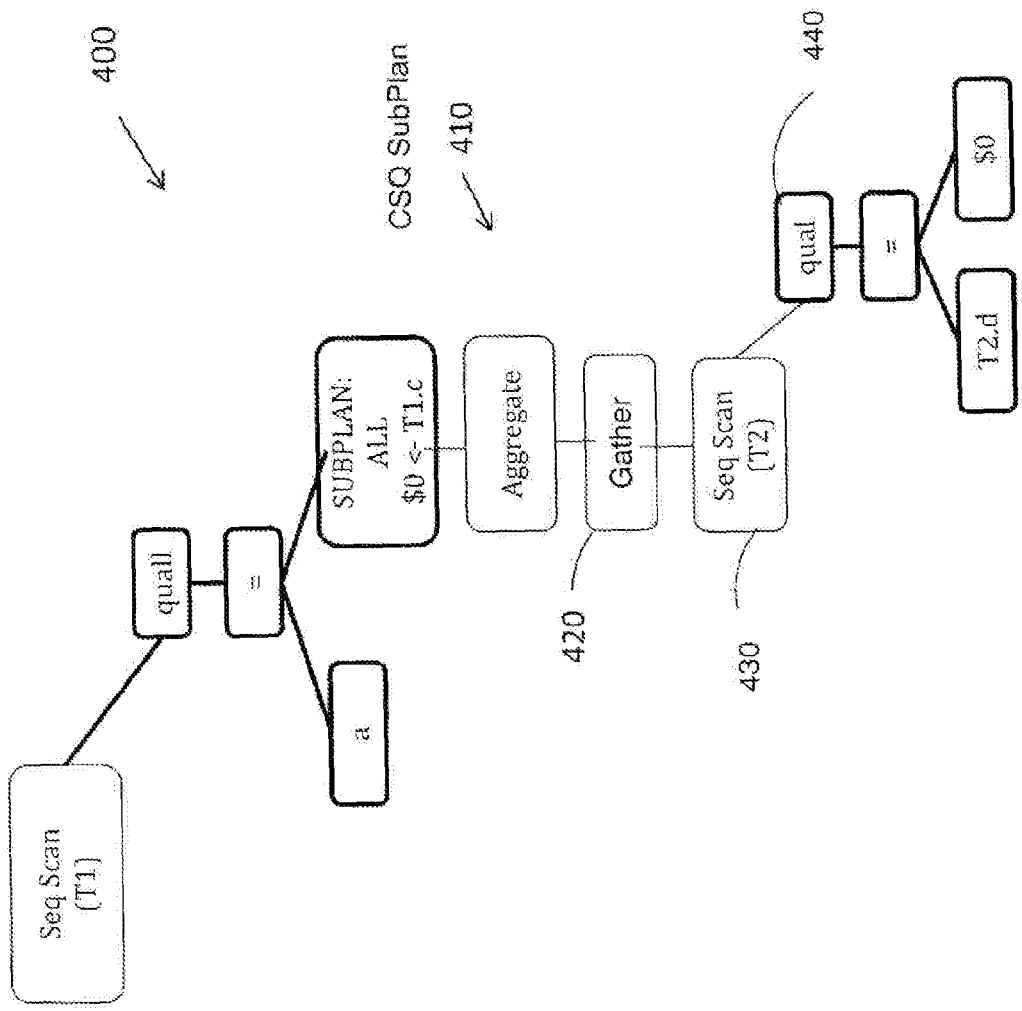
FIG. 4 is a diagrammatic representation of a typical prior art planner approach to formulating the correlated subquery of FIG. 3 that suffers from the problems discussed previously and addressed by the invention of implementing correlated subqueries on distributed databases.

An equivalent CSQ to the foregoing CSQ for tables in a distributed database is:

explain select * from T1 where a=(select min(b) from T2 where T1.c.T2.d;

FIG. 4 illustrates an intermediate execution plan 400 for this CSQ such as may be produced by a query planner for a single database. This plan 400 is subject to rejection because of the motion node "Gather" 420 in the SubPlan 410. The intermediate CSQ SubPlan can produce an incorrect result. A "motion" node or operator is one that moves data between two or more different nodes. Here, the motion operator Gather 420 gathers results from different locations. However, the data required to be gathered is on different segments and not available to the CSQ. Moreover, the Gather motion node 420 is above, i.e., follows, the Seq Scan operator 430 which collects the results comprising an attribute value from the rows of table T2, and the qual or filter operator 440 that evaluates whether the values of the attribute "d" of the rows of table T2 distributed across the segments is equal to the correlation predicate "$0". However, since these results for the other segments are not available at this point in the plan, the intermediate plan 410 produces an incorrect result.

As will be described, the invention addresses the problem of incorrect results from CSQs on distributed databases due to lack of the necessary intermediate results from other segments by providing CSQ subplans that make the results of intermediate CSQs on each database segment available on all other database segments prior to evaluating the CSQ intermediate subplans. The CSQ subplans are run on each segment of the database, and the intermediate results produced by each subplan are provided to all other segments. This insures that each CSQ and segment will have access to the intermediate results from partial subquery executions in all other segments in the distributed database that are necessary to permit correct execution of the CSQ. By providing the intermediate results from each segment to all other segments, every segment will have access to the results necessary to permit execution of their CSQ. The manner in which the invention accomplishes this, as will be described, may be by incorporating a "broadcast" operator into the execution plan that broadcasts intermediate results from a segment to all other segments at the appropriate point in the query plan to insure that the results are available when needed. The intermediate results may comprise, for instance, a tuple of values of attributes produced from a row of a table.

In addition to insuring that each segment will have access to the necessary results from all other segments to permit correct execution of its CSQ, the invention, as will also be described, preferably optimizes a CSQ plan for a distributed database to reduce substantially the necessary processing to evaluate a CSQ and improves efficiency by eliminating redundant processing of data.

Figure 5:
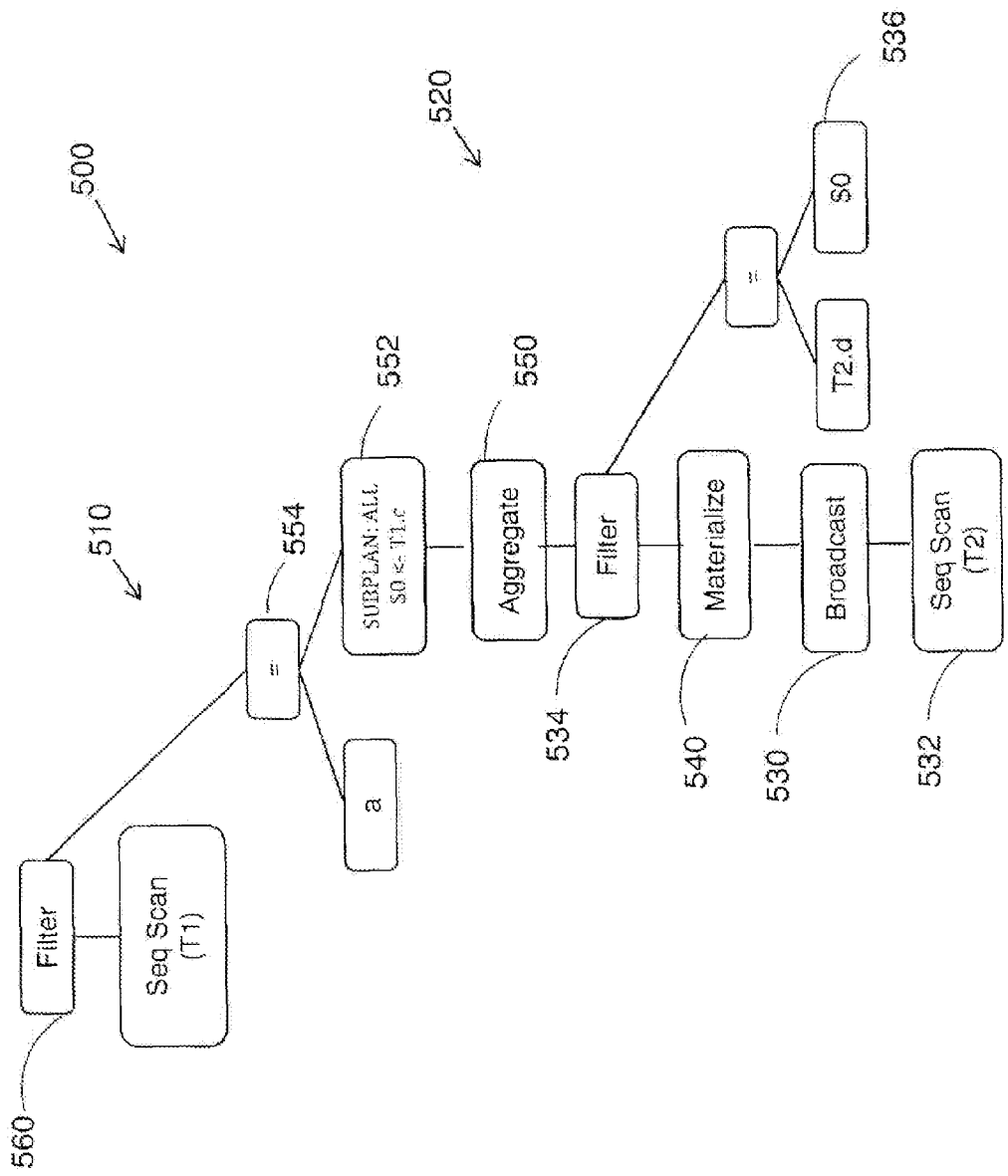
FIG. 5 is a diagrammatic representation of an execution plan for the correlated subquery of FIG. 3 on a distributed database such as illustrated in FIG. 1 in accordance with an embodiment of the invention.

FIG. 5 is a diagrammatic view of the incorrect execution plan 400 of FIG. 4 as transformed in accordance with an embodiment of the invention to produce an execution plan 500 that affords correct, optimized processing for the foregoing CSQ for distributed database tables. As shown in FIG. 5, plan 500 comprises an outer query 510 and an inner subquery 520, and differs from the execution plan 300 of FIG. 3 for a single database and the incorrect plan of FIG. 4 by including a broadcast operator 530 and a materialize operator 540 in the CSQ SubPlan 520.

Generally, the invention transforms an incorrect subplan, such as plan 400 shown in FIG. 4, so that in the transformed plan intermediate results are available at the appropriate time and the transformed plan is correct for a distributed database. To illustrate the transformation process using the incorrect plan 400 as an example, in one embodiment, the transformation first removes all motion nodes from a plan, e.g., Gather node 420, and saves all quals (filter conditions) such as 440 from the leaf nodes. Next, a broadcast "motion" operator (process) 530 that broadcasts intermediate results from SeqScan operations 532 on rows of a table T2 in a segment to all other segments in the distributed database is inserted into the plan. The intermediate results may comprise, e.g., a tuple of values from table T2. The broadcast operator is inserted below (prior to) a correlation operation, e.g., filter operation (534), in the CSQ plan that evaluates the row values against the value of the correlation predicate $0 (536). Generally, a broadcast operator may be inserted into a query plan on top of every leaf node prior to a correlation. This insures that the intermediate results from the CSQs on all segments of the distributed database will be available on each segment so that execution of their CSQs can produce the correct results.

The invention preferably also incorporates into the CSQ subquery plan a materialize operator (process) 540 that materializes or saves the intermediate results broadcast by the segments to disk so that they are available to the sub plan 520 and so that the processing need not be executed multiple times on the same row data. This optimizes the plan by reducing processing and increasing efficiency. The invention may also provide a result operator for evaluating filter conditions.

The aggregate process 550 aggregates the results of filter 534 processes and produces a constant equal to the minimum of a value "b" from T2. The node 552 produces the minimum value against which the value "a" is compared in node 554 to produce a true or false result, and filter 560 produces a partial answer to the query for one row of table T1. The process then repeats for the next row of the table.

In transforming a CSQ, the invention insures that a transformed subplan is correct for producing an answer when executed on a single database segment. A broadcast of the leaf node results occurs on every segment. Thus, it is correct to remove all intermediate motion nodes if a broadcast node is used.

From the forgoing, it can be seen that the invention transforms a subplan for a distributed database by applying non-correlated filters, broadcasting intermediate results to all instances (segments), materializing the result locally on each instance, applying correlated filters, and removing all upstream motion operators. Thus, the invention enables a large class of SQL queries to be run.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method of performing a correlated subquery comprising an outer query and an inner subquery on a parallel shared nothing distributed database having a plurality of distributed database segments, database data being randomly distributed across said database segments such that each database segment stores different data, the method comprising:
  executing said correlated subquery including said inner subquery and said outer query in parallel on all of said distributed database segments of said parallel shared nothing distributed database;
  broadcasting intermediate results of executing said inner subquery from each of said database segments to all other database segments, said broadcasting occurring prior to a point in said inner subquery at which a correlation operation occurs, thereby insuring that the intermediate results from all segments are available to the correlation operation on all other database segments; and
  using said intermediate results in said executing said correlated subquery on all database segments to obtain a final correlated subquery result.

2. The method of claim 1, wherein said intermediate results comprise a tuple of values from rows of a table distributed across said database segments.

3. The method of claim 2, wherein said values comprise attribute values obtained from a row of said table distributed across said database segments.

4. The method of claim 3, wherein said correlation operation comprises evaluating an attribute value against a correlation predicate.

5. The method of claim 3 further comprising aggregating correlation results of said correlations to produce an inner subquery result, and evaluating said inner subquery result against said outer query.

6. The method of claim 1 further comprising saving said intermediate inner subquery results, and using said saved intermediate results to avoid the necessity of redetermining said intermediate results during subsequent processing of said correlated subquery.

7. A method of executing a correlated subquery comprising an outer query and an inner subquery in a parallel shared nothing distributed database comprising a plurality of distributed database segments, database data being randomly distributed across said database segments such that each database segment stores different data, the method comprising:
  transforming said correlated subquery to remove all motion operations that move data from one node to another;
  executing said inner subquery in parallel on all of the segments of said distributed database segments of said parallel shared nothing distributed database and saving intermediate results produced during said executing from scanning data stored in said segments;
  broadcasting the intermediate results from each database segment to all other database segments of said database, said broadcasting being performed prior to executing a correlation operation of said inner subquery that compares said intermediate results to a correlation value; and
  evaluating on each database segment an inner subquery result produced by said inner subquery against an outer query result produced by executing the outer query on each database segment to obtain an answer to said correlated subquery.

8. The method of claim 7 further comprising saving said intermediate results and using said saved intermediate results in subsequent executions to avoid having to redetermine said intermediate results during said subsequent executions.

9. The method of claim 7, wherein said evaluating said result comprises comparing the inner subquery result against a condition specified by said outer query and said outer query result.

10. The method of claim 7, wherein said evaluating comprises aggregating correlation results on each database segment produced by correlation operations on that database segment to produce an aggregated result, and said evaluating comprises evaluating said aggregated result against said outer query.

11. Computer readable non-transitory storage medium for storing instructions for controlling the operation of a computer to perform a correlated subquery comprising inner and outer subqueries on a parallel shared nothing distributed database system having a plurality of distributed database segments, database data being randomly stored across said database segments such that each database segment stores different data, each said database segment having a computer, and said instructions causing said computer on each database segment to:
  execute said correlated subquery including said inner subquery and said outer query in parallel with all of said other distributed database segments of said parallel shared nothing distributed database;
  broadcast intermediate results of executing said inner subquery from said database segment to all of the other database segments of said distributed database system prior to a correlation point in said inner subquery to insure that said intermediate results are available to correlated subqueries being performed on said other database segments; and
  use said intermediate results received from said other database segments in said executing said correlated subquery to obtain a final correlated subquery result.

12. The computer readable medium of claim 11, wherein said intermediate results comprise attribute values from a row of a table distributed across said database segments.

13. The computer readable medium of claim 12 further comprising instructions for aggregating correlation results to produce an inner subquery result for said segment, and instructions for evaluating said inner subquery result against said outer subquery.

14. The computer readable medium of claim 11 further comprising instructions for saving said intermediate results, and for using said saved intermediate results during subsequent inner subquery processing.

* * * * *